July 23, 1935.　　　C. A. MULHOLLAND　　　2,009,067
REFRIGERATING APPARATUS
Filed May 26, 1933　　　2 Sheets-Sheet 1
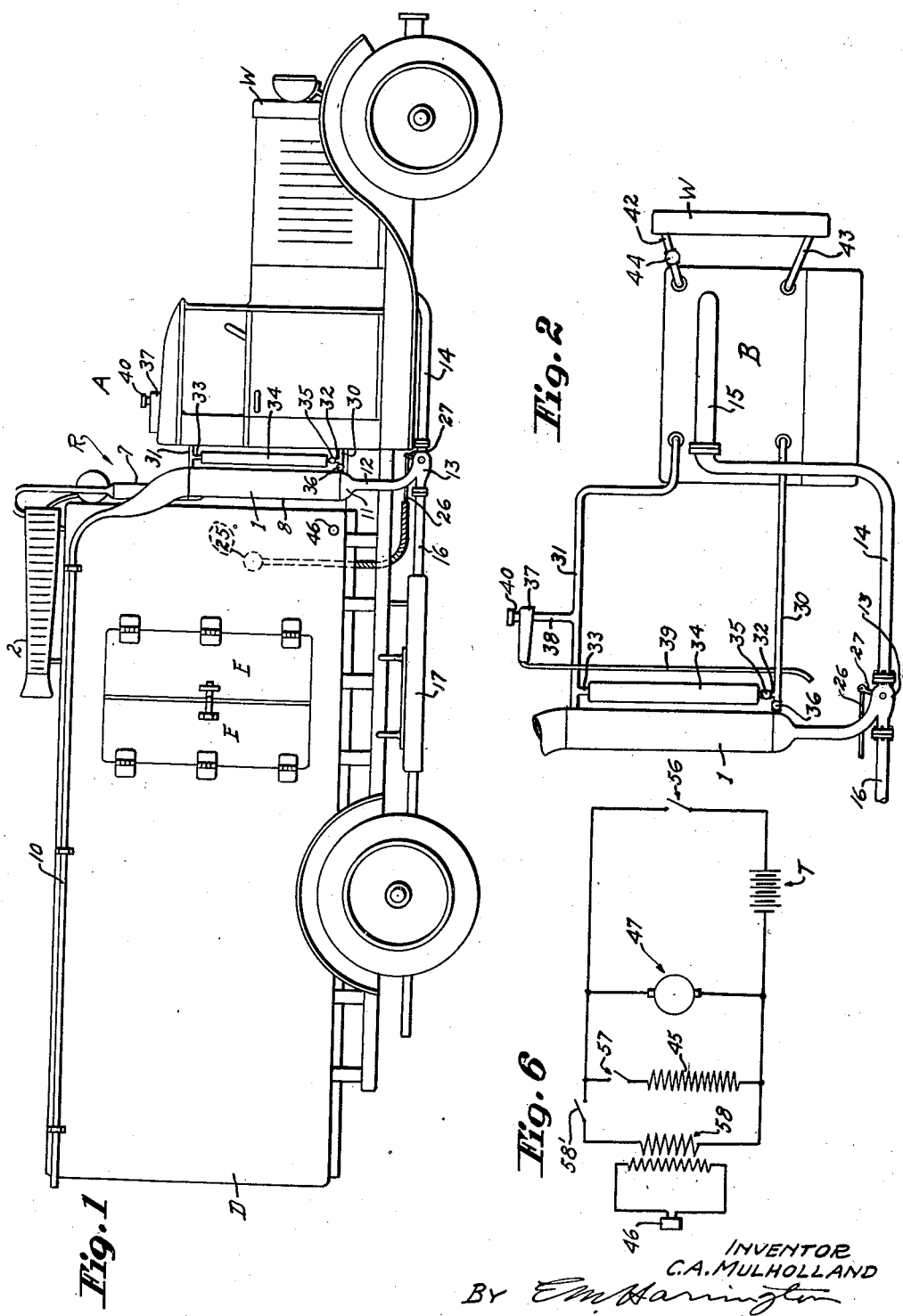
INVENTOR
C.A. MULHOLLAND
By E.M. Harrington
ATTORNEY

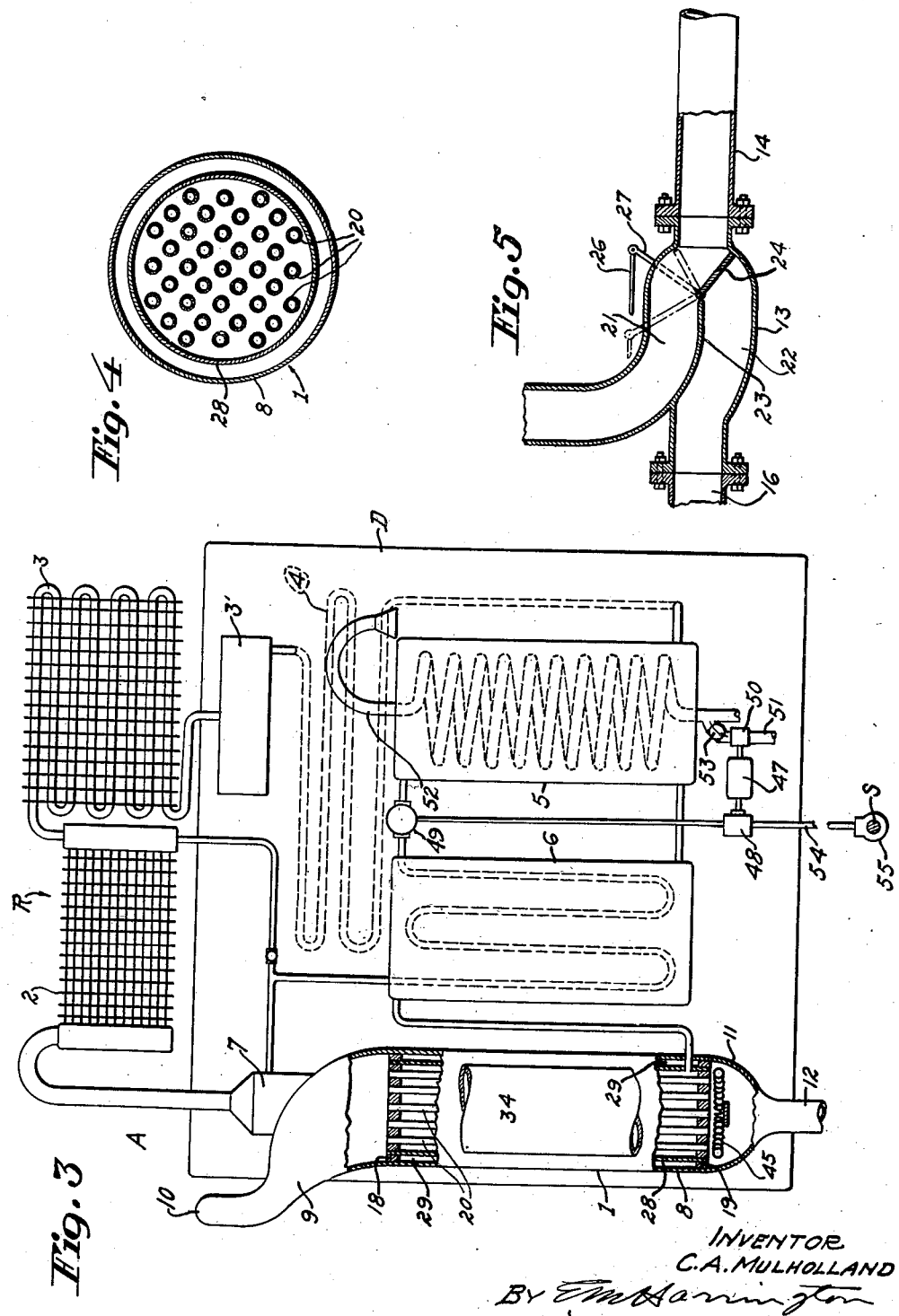

Patented July 23, 1935

2,009,067

UNITED STATES PATENT OFFICE 2,009,067

REFRIGERATING APPARATUS

Clifford A. Mulholland, St. Louis, Mo.

Application May 26, 1933, Serial No. 672,933

9 Claims. (Cl. 62—119)

This invention relates generally to refrigerating apparatus and more specifically to refrigerating apparatus arranged in association with mobile structures such as motor vehicles, railway and railroad cars, etc., the predominant object of the invention being to provide mobile structures of various types that are operated by internal combustion engines and other prime movers which produce waste heat, with refrigerating apparatus of the absorption type and utilize the waste heat produced by said prime movers for operating said refrigerating apparatus.

It is quite generally understood by persons familiar with such matters that in the operation of a refrigerating apparatus which operates on the absorption principle the pressure of vapor from an evaporator is increased by the application of heat to a liquid which contains the dissolved vapors. Thus, water absorbs or dissolves ammonia vapor from an evaporator at low temperature and pressure, and then is made to give up or distill off the ammonia vapor at a higher temperature and pressure. The important feature of this invention is to associate a refrigerating apparatus of the absorption type with a mobile structure which is operated by a prime mover that gives off waste heat during its operation, and to utilize this waste heat as the medium for operating the refrigerating apparatus. In order to illustrate one embodiment of the invention, I show in the drawings forming a part hereof a motor truck which is operated by an internal combustion engine. This motor truck has associated with it a refrigerating apparatus of the absorption type which is so cooperatively associated with the internal combustion engine of the motor truck that the hot products of combustion issuing from the engine, and the heated water which passes through the cooling system of the internal combustion engine, pass to a generator forming a part of the refrigerating apparatus in a manner to supply the heat which causes the refrigerating system to be operated. Thus heat which ordinarily is wasted is caused to perform a useful function and a refrigerated mobile structure is provided which functions in a highly efficient manner.

Figure 1 is a side elevation of a motor truck having an absorption type refrigerating apparatus associated therewith in accordance with this invention.

Figure 2 is a more or less diagrammatical view illustrating the manner of employing the heated water which flows through the cooling system of an internal combustion engine as an aid in applying to a generator associated with said refrigerating apparatus the heat necessary to the operation thereof.

Figure 3 is a front elevation of a refrigerating apparatus of the absorption type showing same associated with a mobile structure in accordance with this invention.

Figure 4 is a cross-section taken through the generator forming part of the refrigerating apparatus employed in carrying out my invention.

Figure 5 is an enlarged sectional view showing the valve structure for controlling passage of hot products of combustion from an internal combustion engine to the generator of refrigerating apparatus of my invention.

Figure 6 is a diagrammatical view illustrating the manner of applying heat electrically to the generator of the refrigerating apparatus of the invention.

In the drawings, wherein is shown for the purpose of illustration, merely, one embodiment of the invention, A designates a motor truck (Figures 1 and 3) which is of substantially normal construction, said motor truck being operated by an internal combustion engine B in the usual manner. The motor truck includes a body D the interior of which it is desired to refrigerate, said body being provided with suitable doors E for closing a doorway leading to said interior of said truck body.

Associated with the motor truck A is a refrigerating apparatus R of the absorption type, said apparatus being made up of the elements which normally comprise such a refrigerating apparatus. In order that a clear and complete understanding may be had of the invention the refrigerating apparatus may be considered as including a generator 1 wherein the total pressure existing consists of the partial vapor pressures of ammonia gas and water. The vapors leaving the generator are condensed in the rectifier (dehydrator) 2 in which the temperature is maintained at a sufficiently low point to condense practically all of the water vapor but not the ammonia. The condensed water re-absorbs a portion of the ammonia and is returned to the generator as a rich liquid. The practically dry ammonia gas is then liquefied in the ammonia condenser 3, passing through the receiver 3', and is expanded in evaporating coils 4 located within the truck body producing a refrigerating effect. The expanded ammonia gas from the evaporating coils is re-absorbed in the absorber 5 by weak liquid which passes from the bottom of the generator through the heat exchanger 6, the rich liquid produced by absorption returning to the generator by passing through the analyzer 7 where it reduces the superheat in the gases given off by the generator. This reduces the amount of heat to be removed in the rectifier and condenser. If desired the analyzer may be omitted to reduce the first cost of the apparatus, but this saving is effected at the expense of economy in operation. The pressure existing in the generator and rectifier depends on the temperature maintained in the condenser, which, in turn, is governed by the quantity and temperature of cooling available. As shown in Figure 1 the condensing unit of the apparatus, which includes the rectifier 2 and the condenser 3, is preferably mounted on the top of the truck body since the cooling effect incident to the rapid passage of said condensing unit through the air when the truck is in motion has its greatest effect because of such exposed position of the condensing unit.

Referring now to the generator 1 of the improved structure disclosed herein, said condenser comprises an outer housing 8 which provides a hollow cylindrical shell. At its upper end the outer housing 8 is of gradually reduced dimensions as indicated at 9 in Figure 3, and this reduced portion of said housing is curved to produce an offset top portion which merges into an exhaust conductor 10 which extends longitudinally of the truck body adjacent to the top thereof. At the lower portion of the generator 1 a reduced portion 11 is provided which merges into a conductor 12 that leads to a valve 13, the housing of the valve 13 communicating also with a conductor 14 which is connected to the exhaust manifold 15 of the internal combustion engine B of the motor truck A, and with the exhaust conductor 16 and muffler 17 of the motor truck as shown most clearly in Figures 1 and 5. The generator 1 is provided within its interior with an upper header 18 and a lower header 19 and extended vertically from the lower to the upper header is a plurality of nested tubes 20. The tubes communicate at their opposite ends with the spaces within the generator above the upper header 18 and below the lower header 19. Because of this arrangement hot products of combustion which pass from the internal combustion engine by way of the exhaust manifold 15, conductor 14, valve 13 and conductor 12, may pass through said tubes and will be exhausted from the generator 1 by way of the portion 9 thereof and the exhaust conductor 10 already referred to herein. The generator 1 and all other parts of the apparatus which require it may be provided with insulating coverings.

The valve 13 of my improved structure as shown most clearly in Figure 5 is provided with a passageway 21 which leads to the generator 1 and a passageway 22 which leads to the exhaust conductor 16 and muffler 17, these passageways being separated by a wall 23 which stops short of the forward end of the valve housing so that both of said passageways may be placed in communication with the conductor 14. Pivotally mounted at the forward end of the wall 23 is a valve member 24 which is movable to positions where passage of products of combustion through the passageways 21 and 22 may be controlled. In other words, the valve member 24 may be positioned as shown in full lines in Figure 5 when all of the hot products of combustion will be directed by said valve member through the passageway 21 to the generator 1. Also the valve member may be positioned as suggested by dotted lines in Figure 5 when all of the products of combustion will be directed through the passageway 22 to the exhaust conductor 16 and muffler 17. In addition to the foregoing the valve member 24 may be moved to intermediate positions where part of the products of combustion will be directed through the passageway 21 and part thereof directed through the passageway 22. In this manner the intensity of the heat to which the interior of the generator is subjected may be regulated so as to regulate the operation of the refrigerating apparatus and control the temperature within the truck body.

In order to automatically control the adjustment of the valve member 24, I arrange within the truck body a thermostatic control 25 of suitable construction. This thermostatic control is connected to the valve member by a suitable connector 26 which is attached to an arm 27 that is fixed to the valve member and is positioned outside of the valve housing. The thermostatic control 25 is operated in response to temperature changes within the truck body and the valve member 24 is adjusted by the operations of the thermostatic control so as to cause more or less hot products of combustion to pass through the generator 1 whereby the refrigerating effect obtained within the truck body will be increased or decreased so as to maintain within the truck body temperature within a fixed range.

Arranged within the generator 1 is an inner wall 28 which is spaced from the outer wall of said generator so as to provide a water jacket 29. The inner wall 28 is supported at its upper and lower ends by the headers 18 and 19, portions of said headers constituting the top and bottom walls of the water jacket 29. Communicating with the water jacket 29 of the generator 1 is a water conductor 30 (Figure 2) which communicates at its opposite end with the water circulatory system of the internal combustion engine B of the motor truck A. Also a similar water conductor 31 communicates at one of its ends with the water jacket 29 of the generator and at its opposite end communicates with the circulatory system of the engine B. The conductors 30 and 31 have connected thereto respectively short conductor sections 32 and 33 which lead from said conductors 30 and 31 to the top and bottom of a hot water storage tank 34. Also the short section of conductor 32 has associated therewith a thermostatically controlled valve 35, and the conductor 30 is provided with a like thermostatically controlled valve 36, the function of which valves will be subsequently pointed out. Arranged preferably on the roof of the cab of the motor truck A is an overflow tank 37 which is connected to the conductor 31 by a short conductor 38. The overflow tank is provided with an overflow pipe 39 which leads downwardly therefrom as shown in Figure 2, and also said overflow tank has associated with it a filling spout 40 which is closed by a suitable cap. The water circulatory system of the invention includes a suitable radiator W to which the water circulatory passageways of the internal combustion engine B are connected by conductors 42 and 43, the conductor 42 being provided with a thermostatically-controlled valve 44 which serves a function to be hereinafter referred to.

When in the use of the invention the internal combustion engine is started the hot water in the water jacket surrounding the engine rises and flows through the water conductors 30 and 31 to the water jacket of the generator where some of its heat is given off to said generator, and back to the water jacket of the engine. During the preliminary circulation of the water the thermostatically-controlled valve 44 is closed whereby circulation of water through the radiator is prevented. Thermostatically-controlled valve 35 at this time remains closed and thermostatically-controlled valve 36 is in an open condition. However, when the generator has been sufficiently heated by the circulating water thermostatically-controlled valve 35 is opened and thermostatically-controlled valve 36 is moved to a closed condition. The process of storing heat in the storage tank 34 then proceeds by circulating hot water from the water jacket of the engine through the storage tank. When the temperature of the water reaches a point where the efficiency of the engine becomes impaired, the thermostatically-controlled valve 44 opens and proper cooling of the water takes place through the radiator coils.

By circulating hot water of the engine cooling system through the water jacket of the generator, as described, substantially all of the waste heat of the internal combustion engine is made available for use in operating the refrigerating apparatus whereby the refrigerating capacity thereof is increased. Also the process of refrigeration is started more rapidly when the engine is placed in operation by applying to the generator the heat of the water in addition to the heat of the exhaust gases. Furthermore, the hot water storage tank 34 provides means for maintaining available a supply of heating medium which will keep the refrigerating apparatus in operation when the engine of the motor truck is stopped for a short time. The wall of water in the water jacket of the generator also prevents rapid fluctuations of temperature in the generator and thereby maintains regulated temperature within the refrigerated body of the motor truck. And, also, since ammonia has a tendency to disintegrate into nitrogen and hydrogen it is advisable to keep the temperature of the solution below 300° F., which is possible because of the use of the water as a heating medium since the boiling point of water at sea level is 212° F.

In order to heat the generator 1 when the internal combustion engine of the motor truck is idle for relatively long periods of time, I locate within said generator, below the tubes 20 therein, an electrical heating unit preferably in the form of a resistance coil 45 (Figures 3 and 6). This unit 45 is electrically connected to a suitable plug 46 (Figure 1) whereby said unit may receive electrical energy from a suitable external source of power. In connection with this arrangement an electric motor 47 (Figure 3) is employed which operates through a suitable clutch 48 a gear pump 49 which functions to force the liquid through the refrigerating apparatus. The electric motor 47 also operates a suction device 50 which is associated with an air conductor 51 that is connected to an air conductor 52 which passes in the form of a coil through the absorber 5 of the refrigerating apparatus. The air conductor 51 is provided with a check valve 53 which is capable of being drawn open by the suction device 50 to permit air to pass in the direction of the arrow in Figure 3, but will prevent passage of air in the reverse direction to that indicated by the arrow referred to.

The shaft 54 which operates the gear pump 49 is connected by a suitable clutch 55, preferably of the overrunning type, to the drive shaft S of the motor truck A so that when said drive shaft is being rotated by operation of the engine of the truck the pump will be operated. However, when the engine of the truck is idle and the electric motor 47 is operated by current from an external source the shaft 54 is rotated through the clutch 48, which is also by preference of the overrunning or one direction type. Operation of the electric motor also operates the suction device 50 with the result that air is drawn through the absorber 5 by way of the air conductor 52 extended therethrough, this air being by-passed through the conductor 51, which if desired may be connected to the generator 1 so that heat which is picked up by the air during its passage through the absorber may be utilized in aiding in the heating of the generator. The air conductor 52 which passes through the absorber 5 by preference leads to the intake manifold of the internal combustion engine whereby preheated air is supplied to said engine to aid in the efficient operation thereof.

It is also intended to operate the electrical heating system from the battery of the motor truck T and so that the electrical heating system may be automatically placed in operation when the engine of the motor truck is stopped I provide a switch 56 (Figure 6) which will be automatically closed when the ignition switch of the engine is opened. The closing of the switch 56 will start the electric motor 47 whereby the liquid will be circulated through the refrigerating apparatus and air will be drawn through the absorber. The electrical heating system includes a thermostatically actuated switch 57, which, if enough heat is obtained from the water stored in the storage tank 34 to continue the refrigerating apparatus remains open thus preventing operation of the heating coil 45. However, as soon as the heat electrical heating system includes a thermostatically operated switch will be automatically closed and the heating coil 45 will be placed in operation to supply heat to the generator. The electrical heating system includes a transformer 58 and switch 58' which are used when outside alternating current is used.

From the foregoing it is plain that substantially all of the waste heat of the prime mover of the motor truck is employed in operating the refrigerating apparatus of my improved structure whereby an efficiently operating structure is provided which is operated with great economy. Also, while I describe my invention as being embodied in a motor truck, I wish it to be understood that the invention may be used in connection with any mobile structure with which application of the invention is adapted.

It is to be understood that when I refer to "refrigerating apparatus" in the specification and claims hereof I desire this language to cover apparatus which cools and otherwise conditions air for use in buses, railway and railroad cars, etc.

I claim:
1. In combination with a mobile structure operated by an internal combustion engine having a fluid circulatory cooling system, a refrigerating apparatus of the absorption type including a generator, means for transmitting products of combustion from said internal combustion engine to said generator, and means for conducting fluid from said circulatory cooling system of said internal combustion engine to said generator.

2. In combination with a mobile structure operated by an internal combustion engine having a fluid circulatory cooling system, a refrigerating apparatus of the absorption type including a generator, means for transmitting products of combustion from said internal combustion engine to said generator, conducting means for conducting said products of combustion through said generator, means for conducting said circulatory cooling system of said internal combustion engine to said generator, and means associated with said generator providing for circulation of said fluid.

3. In combination with a mobile structure operated by an internal combustion engine having a fluid circulatory cooling system, a refrigerating apparatus of the absorption type including a generator, means for transmitting products of combustion from said internal combustion engine to said generator, conducting means for conducting said products of combustion through said generator, means for controlling passage of products of combustion through said generator, means for conducting fluid from said circulatory cooling system of said internal combustion engine to said generator, and means associated with said generator providing for circulation of said fluid.

4. In combination with a mobile structure operated by an internal combustion engine having a fluid circulatory cooling system, a refrigerating apparatus of the absorption type including a generator, means for transmitting products of combustion from said internal combustion engine to said generator, conducting means for conducting said products of combustion through said generator, temperature-controlled means for controlling passage of products of combustion through said generator, means for conducting fluid from said circulatory cooling system of said internal combustion engine to said generator, and means associated with said generator providing for circulation of said fluid.

5. In combination with a mobile structure operated by an internal combustion engine having a fluid circulatory cooling system, a refrigerating apparatus of the absorption type including a generator, means for transmitting products of combustion from said internal combustion engine to said generator, conducting means for conducting said products of combustion through said generator, means for conducting fluid from said circulatory cooling system of said internal combustion engine to said generator, means associated with said generator providing for circulation of said fluid, and thermostatically-actuated means for controlling circulation of said fluid.

6. In combination with a mobile structure operated by an internal combustion engine having a fluid circulatory system, a refrigerating apparatus of the absorption type including a generator, means for transmitting products of combustion from said internal combustion engine to said generator, conducting means for conducting said products of combustion through said generator, means for conducting fluid from said circulatory cooling system of said internal combustion engine to said generator, said means including a storage tank, and means associated with said generator providing for circulation of said fluid.

7. In combination with a mobile structure operated by an internal combustion engine having a fluid circulatory system, a refrigerating apparatus of the absorption type including a generator, means for transmitting products of combustion from said internal combustion engine to said generator, conducting means for conducting said products of combustion through said generator, means for conducting fluid from said circulatory cooling system of said internal combustion engine to said generator, said means including a storage tank, means associated with said generator providing for circulation of said fluid and thermostatically-actuated means for controlling circulation of said fluid.

8. In combination with a mobile structure operated by an internal combustion engine, a refrigerating apparatus of the absorption type including a generator and an absorber, means for transmitting products of combustion from said internal combustion engine to said generator for transmitting heat thereto, and a conductor for air which passes through said absorber and leads to the intake of said internal combustion engine.

9. In combustion with a mobile structure operated by an internal combustion engine having a fluid circulatory cooling system, a refrigerating apparatus of the absorption type including a generator, and means for conducting heated fluid from said circulatory cooling system of said internal combustion engine to said generator for the purpose of transmitting heat of the fluid to the generator.

CLIFFORD A. MULHOLLAND.